United States Patent
Richardson et al.

(10) Patent No.: US 10,967,786 B1
(45) Date of Patent: Apr. 6, 2021

(54) EL COATING UNDER HEADLINER FABRIC

(71) Applicant: Honda Motor Co., Ltd., Tokyo (JP)

(72) Inventors: Kathryn A. Richardson, Powell, OH (US); Philip Z. Teano, Huntington Beach, CA (US); Nichole A. Verwys, Marysville, OH (US); Zainab I. Ali, Marysville, OH (US); Patricia A. Scott, Galloway, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/658,594

(22) Filed: Oct. 21, 2019

(51) Int. Cl.
| | | |
|---|---|---|
| *B60Q 3/74* | (2017.01) | |
| *B32B 5/24* | (2006.01) | |
| *B32B 5/02* | (2006.01) | |
| *F21V 23/04* | (2006.01) | |
| *B60Q 3/82* | (2017.01) | |
| *B60R 13/02* | (2006.01) | |
| *F21Y 115/20* | (2016.01) | |

(52) U.S. Cl.
CPC .............. *B60Q 3/745* (2017.02); *B32B 5/022* (2013.01); *B32B 5/245* (2013.01); *B60Q 3/82* (2017.02); *B60R 13/0212* (2013.01); *F21V 23/04* (2013.01); *B32B 2457/00* (2013.01); *B32B 2605/003* (2013.01); *F21Y 2115/20* (2016.08)

(58) Field of Classification Search
None
See application file for complete search history.

(56) References Cited

U.S. PATENT DOCUMENTS

| | | | | |
|---|---|---|---|---|
| 4,138,620 | A | * | 2/1979 | Dickson ................. G09F 13/04 313/1 |
| 6,464,381 | B2 | * | 10/2002 | Anderson, Jr. .......... H01H 9/18 362/153 |
| 6,773,129 | B2 | | 8/2004 | Anderson, Jr. et al. |
| 7,234,850 | B2 | | 6/2007 | Garcia et al. |
| 8,384,288 | B2 | | 2/2013 | Park et al. |

(Continued)

FOREIGN PATENT DOCUMENTS

| | | |
|---|---|---|
| DE | 10313068 | 12/2004 |
| DE | 102008006163 | 7/2009 |

(Continued)

OTHER PUBLICATIONS

B. Kühner. "Electroluminescence Light in the Automotive Industry" ATZelektronik worldwide Dec. 2006, vol. 1, Issue 4, pp. 27-28.

(Continued)

*Primary Examiner* — Britt D Hanley
(74) *Attorney, Agent, or Firm* — Rankin, Hill & Clark LLP

(57) ABSTRACT

An electroluminescent light source included as a sheet-like structure as part of headliner in a vehicle. The electroluminescent light source is arranged under an outer layer of fabric, as well as under a layer of foam and a layer of nonwoven textile material. The electroluminescent light source lacks a dedicated housing for containing the electroluminescent light source, which allows for the headliner to maintain a flat and uniform surface that is undisturbed by the inclusion of the electroluminescent light source. When the electroluminescent light source is activated, the emitted light has sufficient brightness to shine through the various layers of the headliner to illuminate the interior of the vehicle.

20 Claims, 2 Drawing Sheets

(56) References Cited

U.S. PATENT DOCUMENTS

| | | | |
|---|---|---|---|
| 10,059,259 B2 | 8/2018 | Cannon et al. | |
| 2010/0195337 A1* | 8/2010 | Heite | C09K 11/565 362/459 |
| 2018/0279444 A1* | 9/2018 | Rye | H05B 33/10 |

FOREIGN PATENT DOCUMENTS

| | | |
|---|---|---|
| DE | 102012109763 | 4/2014 |
| TW | 201718269 | 6/2017 |

OTHER PUBLICATIONS

T. Dias et al. "Development and analysis of novel electroluminescent yarns and fabrics for localized automotive interior illumination", Textile Research Journal, 82(11) 1164-1176, Jan. 19, 2012.

* cited by examiner

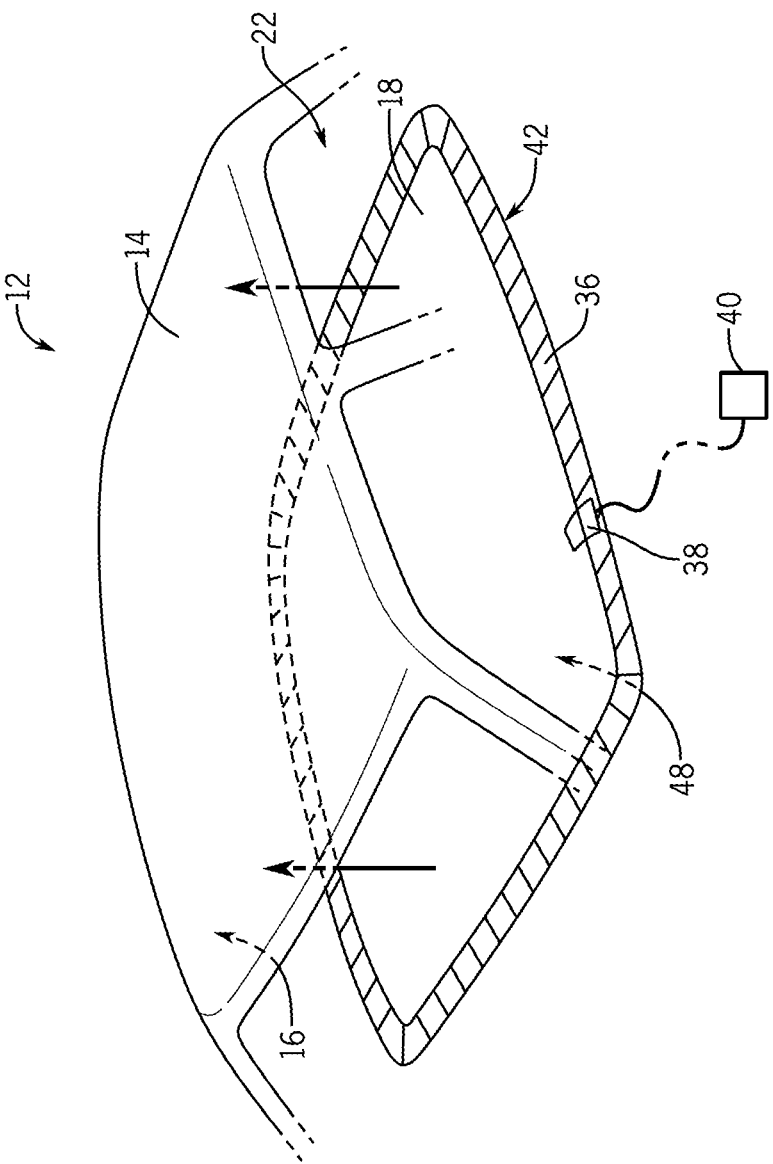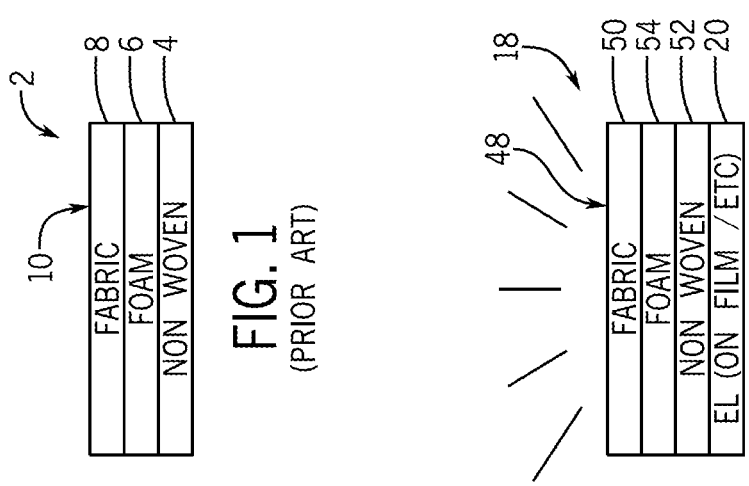

EL COATING UNDER HEADLINER FABRIC

BACKGROUND

Vehicles typically include a metal roof over a passenger compartment of the vehicle. As seen in FIG. 1, the interior surface of the roof is often lined with a headliner 2, consisting of an underlying non-woven textile layer 4 arranged closest to the metal roof, which textile layer 4 is covered by a foam layer 6, which is covered by a fabric layer 8 defining an exposed surface 10 of the headliner 2 that is visible to occupants inside the passenger compartment of the vehicle.

Interior illumination of the passenger compartment is typically accomplished using lighting fixtures including a light bulb arranged in a housing. The housing is attached to the interior surface of the roof of the vehicle, so that light emitted by the light bulb is directed down from the roof to illuminate the passenger compartment of the vehicle. This type of lighting fixture provides light that emanates from a single location (i.e. from the lighting fixture), and thus may present uneven lighting throughout the passenger compartment. This type of light fixture also includes the use of the housing, which presents a bulky protrusion on the interior surface of the roof of the vehicle, and thus presents a non-uniform appearance in relation to the headliner 2 that may be undesirable.

BRIEF DESCRIPTION

According to one aspect, a headliner for covering an associated interior surface of a roof of a vehicle, includes an electroluminescent light source and a fabric layer. The electroluminescent light source has a sheet-like structure defining two major surfaces that are oppositely directed from one another. The electroluminescent light source includes a phosphor layer that when activated emits light from a first surface of the two major surfaces. The fabric layer covers the first surface. When the phosphor layer is activated, the emitted light is transmitted through the fabric layer and is visible through the fabric layer.

According to another aspect, a vehicle includes a roof, a headliner, and a fabric layer. The roof has an interior surface facing an interior of the vehicle. The headliner covers the interior surface of the roof, and includes an electroluminescent light source having a sheet-like structure defining two major surfaces that are oppositely directed from one another. The electroluminescent light source includes a phosphor layer that emits light from a first surface of the two major surfaces when activated. The fabric layer covers the first surface. The emitted light is transmitted away from the interior surface of the roof, through the fabric layer, and toward the interior of the vehicle. The emitted light is visible through the fabric layer.

BRIEF DESCRIPTION OF THE DRAWINGS

FIG. 1 is a prior art view of a headliner.

FIG. 2 is a schematic side view of a headliner including an electroluminescent light source according to the present subject matter.

FIG. 3 is a perspective cut away view of a portion of a vehicle including a headliner according to the present subject matter.

DETAILED DESCRIPTION

Figure 4:
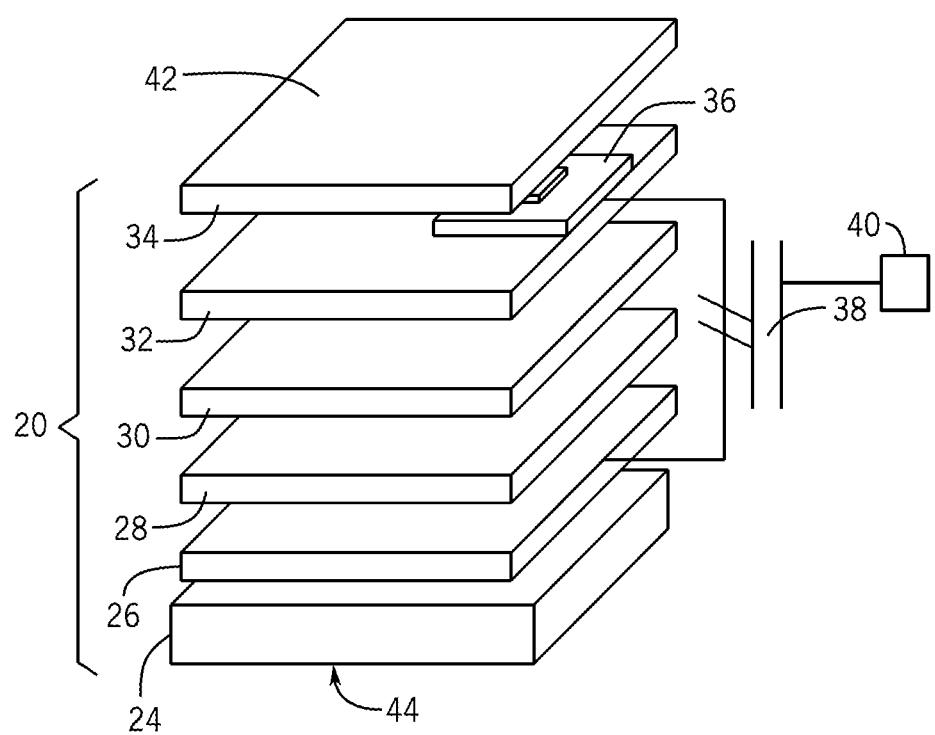
FIG. 4 is a schematic exploded view of an electroluminescent light source according to the present subject matter.

Referring now to the drawings, wherein like numerals refer to like parts throughout the several views, the present subject matter includes a vehicle 12 (a portion of which is depicted in FIG. 3) having a roof 14. The interior surface 16 of the roof 14 may be covered with a headliner 18 as shown by the arrows in FIG. 3. The headliner 18 includes an electroluminescent light source 20 for illuminating a passenger compartment 22 in the interior of the vehicle 12 under the roof 14. The headliner 18 may be continuous and cover the entire interior surface 16 of the roof 14.

FIG. 4 depicts an exemplary schematic stacking arrangement for an electroluminescent light source 20. As illustrated, the electroluminescent light source 20 includes a substrate 24 (also referred to herein as "base layer 24" or "substrate layer 24"), a rear electrode 26, a dielectric layer 28, a phosphor layer 30, a front electrode 32, and a top layer 34. A bus bar 36 is connected to the front electrode 32 to provide an electrical connection between the front electrode 32 and the rear electrode 26, and between the front electrode 32 and a conductive lead 38, which is connected to a power source 40. The power source 40 may be a battery or alternator of the vehicle 12, or other power source.

The electroluminescent light source 20, and specifically the phosphor layer 30, emits light when activated, which is accomplished by supplying power to the electroluminescent light source 20 through the conductive lead 38. The electroluminescent light source 20 comprises a thin flexible sheet-like structure having two major surfaces (i.e. top surface 42 and bottom surface 44) that are oppositely directed from one another. The electroluminescent light source 20 may provide "two-way" illumination, wherein both of the top surface 42 and the bottom surface 44 of the electroluminescent light source 20 are light emitting surfaces. In other embodiments the electroluminescent light source 20 provides "one-way" illumination, wherein only a first surface of the two major surfaces (e.g. top surface 42) of the electroluminescent light source 20 is a light emitting surface, while the second surface of the two major surfaces (e.g. bottom surface 44) is not a light emitting surface.

The electroluminescent light source 20 may include one or more individual electroluminescent lamps that may operate independently from one another or collectively in order to emit light in an independent or collective manner. In a non-limiting example, the electroluminescent light source 20 may be in the form of electroluminescent lamps disclosed in U.S. Pat. No. 8,44,388, the contents of which is incorporated by reference herein.

As depicted, one or more top layers 34 can be provided as a transparent top coat ("clearcoat top layer") that presents the top surface 42. The one or more top layers 34 provide protection to the electroluminescent light source 20, and can have a total thickness of 25 microns to 125 microns. When the electroluminescent light source 20 is not activated and does not emit light, the top layer(s) 34 may provide an opaque. That is, when the electroluminescent light source 20 is not activated, the top layer 34 is not backlit by the underlying phosphor layer 30, and therefore the top layer 34 may appear to have and opaque appearance or finish. Alternatively, the top layer 34 may appear transparent or translucent when the electroluminescent light source 20 is not activated.

The electrically conductive front electrode 32 is provided under the one or more top layers 34, i.e. the front electrode 32 is covered by the top layer 34. The front electrode 32 is a film coating layer that may be both electrically conductive and generally transparent to light. The front electrode 32 may comprise such materials as, without limitation, conductive polymers (PEDOT), carbon nanotubes (CNT), antimony tin oxide (ATO) and indium tin oxide (ITO). An illustrative commercial product is CLEVIOS™ conductive, transparent and flexible polymers (available from Heraeus Clevios GmbH of Leverkusen, Germany) diluted in isopropyl alcohol as a thinner/drying agent. CLEVIOS™ conductive polymers exhibit relatively high efficacy. In addition, CLEVIOS™ conductive polymers are based on a styrene co-polymer and thus provides a ready mechanism for chemical crosslinking/mechanical bonding with the underlying phosphor layer 30. In a non-limiting example, the front electrode 32 has a thickness of 1 to 25 microns.

The bus bar 36 may be interposed between the top layer 34 and the front electrode 32. The bus bar 36 may be provided as a relatively low-impedance strip of conductive material, usually comprised of one or more of the materials usable to produce the bottom or rear electrode 26. In an illustrative example, the bus bar 36 is comprised of silver. The bus bar 36 is typically applied to the peripheral edge 46 of the lit field. Although the bus bar 36 is generally depicted as being on top of the front electrode 32 if FIG. 4, the bus bar 36 may be applied adjacent to the front electrode 32, or below the front electrode 32.

Below the front electrode 32, the phosphor layer 30 is provided (i.e. the phosphor layer 30 is covered by the front electrode 32). The phosphor layer 30 is a semi-conductive film coating layer comprised of a material (such as metal-doped Zinc Sulfide (ZnS)) encapsulated within an electrostatically permeable polymer matrix. When excited by the presence of an alternating electrostatic field generated by an AC signal, the doped ZnS absorbs energy from the field, which it in turn re-emits as a visible-light photon upon returning to its ground state. In a non-limiting example, the phosphor layer 30 comprises about a 2:1 solution of co-polymer and dilute ammonium hydroxide. To this solution, a quantity of metal-doped ZnS based phosphors doped with at least one of copper, manganese and silver (i.e., ZnS:Cu, Mn, Ag, etc.) pre-wetted in a dilute ammonium hydroxide is added to form a supersaturated suspension. In a non-limiting example, the phosphor layer 30 has a thickness of 30 to 100 microns.

Below the phosphor layer 30, a dielectric layer 28 is provided (i.e. the phosphor layer 30 covers the dielectric layer 28) that electrically insulates the phosphor layer 30 from the rear electrode 26. The dielectric layer 28 may be an electrically non-conductive film coating layer including a material (typically Barium Titanate-$BaTiO_3$) possessing high dielectric constant properties encapsulated within an insulating polymer matrix having relatively high permittivity characteristics (i.e., an index of a given material's ability to transmit an electromagnetic field). In an illustrative example, the dielectric layer 28 comprises about a 2:1 solution of co-polymer and dilute ammonium hydroxide. To this solution a quantity of $BaTiO_3$, which has been pre-wetted in ammonium hydroxide, may be added to form a supersaturated suspension. In embodiments providing two-way illumination, the dielectric layer 28 may be transparent so that light can be transmitted through the dielectric layer 28 and emanate from the bottom surface 44. In a non-limiting example, the dielectric layer 28 may comprise at least one of a titanate, an oxide, a niobate, an aluminate, a tantalate, and a zirconate material, among others.

Below the dielectric layer 28, a rear electrode layer 26 is provided (i.e. the dielectric layer 28 covers the rear electrode 26) that is electrically connected to the conductive lead 38 via the bus bar 36, which conductive lead 38 is connected to the power source 40 to thereby provide power to the electroluminescent light source 20 for illumination thereof. The rear electrode 26 may comprise any of the material that are used for the front electrode 32. The rear electrode layer 26 is a film coating layer that may be a sprayable conductive material and may form the rough outline of the electroluminescent "lit field". In a non-limiting example such as in embodiments providing one-way illumination, the rear electrode 26 may be made using a highly conductive, generally opaque material. Examples of such materials include, without limitation, an alcohol/latex-based, silver-laden solution such as SILVASPRAY™ available from Caswell, Inc. of Lyons New York, and a water-based latex, copper-laden solution such as "Caswell Copper" copper conductive paint, also available from Caswell, Inc., and mixtures thereof.

In a non-limiting example, the rear electrode 26 may be a metal plating where a suitable conductive metal material is applied to a non-conductive substrate 24 (which is optionally transparent) using any suitable process for the select metal plating. Example types of metal plating include, without limitation, electroless plating, vacuum metalizing, vapor deposition and sputtering. In one embodiment, the rear electrode 26 is provided on the substrate 24, with subsequent layers being formed thereon to provide an electroluminescent light source 20.

In other embodiments where two-way illumination is provided, the rear electrode 26 may comprise transparent materials. The rear electrode 26 may be made from an electrically conductive, generally clear transparent layer such as, without limitation, "CLEVIOS™ S V3" and or "CLEVIOS™ S V4" conductive polymers, available from Heraeus Clevios GmbH of Leverkusen, Germany. This transparent configuration for the rear electrode 26 allows for two-way illumination.

A primer layer (not shown) may be positioned between the rear electrode 26 and the substrate 24. The primer layer may be oxide-based and may serve to electrically insulate the subsequent conductive and semi-conductive layers from the substrate/transparent panel, and/or may also promote adhesion between the substrate 24 and subsequently applied layers. In a non-limiting example, the primer layer may be a transparent layer, such as a transparent polymeric material. Illustrative examples include polyurethane coatings such as single or two-component polyurethane systems.

The conductive lead 38 may comprise any of the materials that may be used for the front electrode 32 or the rear electrode 26. The conductive lead 38 can be electrically connected to power source 40 to thereby electrically connect the electroluminescent light source 20 to the power source 40. During operation, a voltage supply from the power source 40 and through the conductive lead 38 can be varied to change a brightness of the electroluminescent light source 20. Also, a frequency of the power supplied to the conductive lead 38 can be varied to change a color of the electroluminescent light source 20.

The electroluminescent light source 20 can be included in a variety of shapes, sizes, configurations, and locations within or on the vehicle 12, and may include a one or more individual electroluminescent lamps, or may include a single electroluminescent lamp that has more than one dielectric layer 28, more than one front electrode 32, more than one rear electrode 26, a common phosphor layer 30, and a common top layer 34. The multiple dielectric layers 28 may be electrically isolated from one another by gaps filled with a non-conductive material, such as a non-conductive polymer, as can the multiple electrode layers 26, 32. In this configuration, various regions of the lit field of electroluminescent lamp can be separately activated to thereby emit light from different portions (e.g. right side or left side) of the electroluminescent lamp. In accordance with the present disclosure, the vehicle 12 can include additional electroluminescent lamps as desired other than those specifically described herein.

Because the electroluminescent light source 20 is flexible, it can be conformed to the contours and shape of the base layer 24, which may include complex curves. The base layer 24 may include a surface (e.g. interior surface 16 of the roof 14) of the vehicle 12 with the other layers being built up upon the surface, or the base layer 24 may include a flexible film used to prepare a stand-alone electroluminescent light source 20, which may then be applied to a surface of the vehicle 12. The substrate 24 may be a film layer (e.g. plastic film) or other layer that gives structure to the electroluminescent light source 20, which thereby may allow the electroluminescent light source 20 to be assembled first, and thereafter be mounted on an underlying component of the vehicle, such as the interior surface 16 of the roof 14. Alternatively, the substrate 24 may itself be the roof 14, or other components, where the other layers of the electroluminescent light source 20 are formed directly on the interior surface 16 of the roof 14, or on other vehicle components acting as the substrate 24.

Although the present subject matter is described in terms of an electroluminescent light source emitting light, it will be understood that the illumination mechanism is not limited in any way. Illustrative examples include a light emitting diode and an organic light-emitting diode configured in a film or sheet that is positionable on the base layer 24.

The headliner 18 may operate to provide illumination to the passenger compartment 22 of the vehicle 12. The electroluminescent light source 20 may be coextensive with the entire area of the headliner 18, and thus may provide an even emission of light from the entirety of the exposed surface 48 of the headliner 18, which may produce even lighting throughout the passenger compartment 22 of the vehicle 12. Alternatively, the electroluminescent light source 20 may be arranged over only a portion of the area of the headliner 18.

The headliner 18 may provide illumination to the passenger compartment 22 by activation of the electroluminescent light source 20 (i.e. activation of the phosphor layer 30) to emit light that is emitted away from the roof 14, and down toward the passenger compartment 22 so that the emitted light is visible from the passenger compartment 22. When the electroluminescent light source 20 is activated, the emitted light has sufficient brightness to shine through the various layers of the headliner 18 to illuminate the interior of the vehicle 12.

The activation of the electroluminescent light source 20 to emit light may be based on any number of criteria, including but not limited to, movement of a door of the vehicle 12 between a closed position and an open position; the operation, a function, or a status of the vehicle 12; operation of a switch; proximity of an occupant to the vehicle 12; other factors or circumstances; or combinations thereof.

With reference to FIG. 2, the headliner 18 may include a fabric layer 50 covering the electroluminescent light source 20 (e.g. covering the top surface 42, which may be the light emitting surface of the electroluminescent light source 20). The fabric layer 50 may define the exposed surface 48 of the headliner 18 that is visible to vehicle occupants in the passenger compartment 22. As such, the fabric layer 50 is the visible portion of the headliner 18, and thus may have a particular color, weave pattern, or other features as desired for presenting as the visible exposed surface 48.

The headliner 18 as depicted in FIG. 2 may be flipped upside down when installed onto the interior surface 16 of the roof 14, such that the electroluminescent light source 20 is arranged in FIG. 3 as a top-most layer adjacent to the interior surface 16, while the fabric layer 50 may be arranged in FIG. 3 as the bottom-most layer and having the exposed surface 48 facing down closest to the vehicle occupants.

The fabric layer 50 may be continuous over the entire headliner 18, and thus define the entire exposed surface 48. Because the fabric layer 50 may be continuous over the entire headliner 18, it may be uninterrupted by housings used for conventional lighting fixtures, and thus the exposed surface 48 of the headliner 18, which may be defined by the fabric layer 50, may present a uniform and continuous appearance along the entire interior surface 16 of the roof 14.

The fabric layer 50 is not particularly limited, and may include various materials including but not limited to, acetate, wool, cotton, polyester, nylon, latex, linen, silk, neoprene, polyamide, rayon, satin, spandex, velvet, vinyl and combinations thereof, and may be made by weaving or knitting.

The fabric layer 50 is configured to allow the emitted light from the electroluminescent light source 20 to be transmitted through the fabric layer 50 and be visible from the passenger compartment 22 through the fabric layer 50. For this purpose, the fabric layer 50 may have a layer thickness, thread count, number of voids through the thickness, or other features that allows the emitted light to be transmitted through the fabric layer 50 and be visible to vehicle occupants through the fabric layer 50. In a non-limiting example, a thicknesses of the fabric layer 50 may be 0.1 mm-5 mm.

The headliner 18 may also include a non-woven textile layer 52 covering the electroluminescent light source 20 and arranged between the fabric layer 50 and the electroluminescent light source 20. The non-woven textile layer 52 may be included to provide some level of structure to the headliner 18, or to provide a surface upon which the electroluminescent light source 20 is attached before being attached to the roof 14.

The non-woven textile layer 52 is not particularly limited, and may include various materials made from fibers that are bonded together by chemical, mechanical, heat or solvent treatments, and not by weaving or knitting. The non-woven textile layer 52 may include fibers such as, but are not limited to, wood fibers, animal fibers, mineral fibers, cotton fibers, glass fibers, cellulosic fibers, polylactide fibers, polyester fibers, polyamide fibers, polypropylene fibers, other polymer fibers, metallic fibers, silicon carbide fibers, and combinations thereof.

Like the fabric layer 50, the non-woven textile layer 52 is also configured to allow the emitted light from the electroluminescent light source 20 to be transmitted through the non-woven textile layer 52 and be visible from the passenger compartment 22 through the non-woven textile layer 52. For this purpose, the fabric layer 50 may include transparent fibers, and/or have a layer thickness, fiber count, number of voids through the thickness, or other features that allows the emitted light to be transmitted through the non-woven textile layer 52 and be visible to vehicle occupants through the non-woven textile layer 52. In a non-limiting example, a thicknesses of the non-woven textile layer 52 may be 0.01 mm-1 mm.

The headliner 18 may also include a foam layer 54 covering the electroluminescent light source 20 and the non-woven textile layer 52, and arranged between the fabric layer 50 and the non-woven textile layer 52. The foam layer 54 may be included to provide a desired tactile characteristic to the headliner 18, such as a soft feeling to the headliner 18, or to provide cushioning between the vehicle occupants and the metal roof 14. The foam layer 54 is not particularly limited, and may include various solid foamed material including, but are not limited to, ethylene/vinyl acetate, polyethylene, nitrile rubber, polyimide, polypropylene, polystyrene, polyurethane, silicone, polyvinyl chloride, and combinations thereof; and may be formed by extrusion, expansion or chemical reaction.

Like the fabric layer 50, the foam layer 54 is also configured to allow the emitted light from the electroluminescent light source 20 to be transmitted through the foam layer 54 and be visible from the passenger compartment 22 through the foam layer 54. For this purpose, the foam layer 54 may include transparent foamed materials, and/or have a layer thickness, bubble size, bubble count, or other features that allows the emitted light to be transmitted through the foam layer 54 and be visible to vehicle occupants through the foam layer 54. In a non-limiting example, a thicknesses of the foam layer 54 may be 1 mm-10 mm. The headliner 18 may include other layers or components as desired.

When included in the headliner 18, the fabric layer 50, non-woven textile layer 52, the foam layer 54, or combinations thereof may camouflage the electroluminescent light source 20 from being visible therethrough in the passenger compartment 22. In this regard, the fabric layer 50, non-woven textile layer 52, the foam layer 54, or combinations thereof may be sufficient thick, translucent or opaque, or have other features to camouflage the electroluminescent light source 20, or any underlying layers from being visible from the passenger compartment 22. In a non-limiting example, the only layer of the headliner 18 that is visible from the passenger compartment 22 may be the fabric layer 50 presenting the exposed surface 48 of the headliner 18.

With reference to FIGS. 2 and 4, the electroluminescent light source 20 is not included in a dedicated housing for its containment or mounting. Instead, the electroluminescent light source 20 is a stand-alone multi-layer sheet-like structure that is not contained within a housing for mounting the electroluminescent light source 20 to the interior surface 16, or for other purposes. The electroluminescent light source 20, e.g. the top surface 42, may be arranged directly adjacent to the non-woven textile layer 52; and the bottom surface 44 may be arranged directly adjacent to (e.g. contacting) the interior surface 16 of the roof 14. If no separate substrate layer 24 is included, then the rear electrode 26 may be arranged adjacent to the interior surface 16, which may act as the substrate layer 26.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A headliner for covering an associated interior surface of a roof of a vehicle, the headliner including:
an electroluminescent light source having a sheet-like structure defining two major surfaces that are oppositely directed from one another, the electroluminescent light source including a phosphor layer that when activated emits light from a first surface of the two major surfaces, and a rear electrode being in direct contact with the associated interior surface of the roof and defining a second surface of the two major surfaces; and
a fabric layer covering the first surface;
wherein when the phosphor layer is activated, the emitted light is transmitted through the fabric layer and is visible through the fabric layer.

2. The headliner according to claim 1, wherein the electroluminescent light source is coextensive with an entire area of the headliner, and is not contained within a housing for mounting the electroluminescent light source to the associated interior surface.

3. The headliner according to claim 1, further including a foam layer sandwiched between the electroluminescent light source and the fabric layer,
wherein the emitted light is transmitted through the foam layer and is visible through the foam layer.

4. The headliner according to claim 3, further including a non-woven textile layer arranged between the electroluminescent light source and the foam layer,
wherein the emitted light is transmitted through the non-woven textile layer and is visible through the non-woven textile layer.

5. The headliner according to claim 4, wherein the electroluminescent light source is camouflaged by the fabric layer, the foam layer, the non-woven textile layer, or combinations thereof.

6. The headliner according to claim 1, wherein the electroluminescent light source includes:
the rear electrode defining a lit field of the electroluminescent light source, the lit field having a peripheral edge,
a dielectric layer covering the rear electrode,
the phosphor layer covering the dielectric layer,
a front electrode covering the phosphor layer,
a bus bar contacting the front electrode and in electrical connection with the front electrode, the rear electrode, and an associated power source, the bus bar entirely surrounding the peripheral edge of the lit field, and
a clearcoat top layer covering the front electrode.

7. The headliner according to claim 6, wherein:
the rear electrode is a film coating layer formed from a sprayed conductive material that is sprayed on the associated interior surface of the roof.

8. The headliner according to claim 1, wherein the electroluminescent light source selectively emits light by operation of a switch.

9. The headliner according to claim 1, wherein when the headliner is arranged to cover the associated interior surface of the roof of the vehicle, the fabric layer defines an exposed surface of the headliner that is visible from a passenger compartment of the vehicle.

10. A vehicle including:
a roof having an interior surface facing an interior of the vehicle;
a headliner covering the interior surface of the roof, the headliner including an electroluminescent light source having a sheet-like structure defining two major surfaces that are oppositely directed from one another, the electroluminescent light source including a phosphor layer that emits light from a first surface of the two major surfaces when activated, a rear electrode being in direct contact with the interior surface of the roof and defining a second surface of the two major surfaces, and a fabric layer covering the first surface;
wherein the emitted light is transmitted away from the interior surface of the roof, through the fabric layer, and toward the interior of the vehicle, and
wherein the emitted light is visible through the fabric layer.

11. The vehicle according to claim 10, wherein:
the headliner further includes a foam layer arranged between the electroluminescent light source and the fabric layer; and
the emitted light is transmitted through the foam layer and is visible through the foam layer.

12. The vehicle according to claim 11, wherein:
the headliner further includes a non-woven textile layer arranged between the electroluminescent light source and the fabric layer; and
the emitted light is transmitted through the non-woven textile layer and is visible through the non-woven textile layer.

13. The vehicle according to claim 12, wherein the electroluminescent light source is camouflaged by the fabric layer, the foam layer, the non-woven textile layer or combinations thereof.

14. The vehicle according to claim 10, wherein the electroluminescent light source includes:
the rear electrode defining a lit field of the electroluminescent light source, the lit field having a peripheral edge,
a dielectric layer covering the rear electrode,
the phosphor layer covering the dielectric layer,
a front electrode covering the phosphor layer,
a bus bar contacting the front electrode and in electrical connection with the front electrode, the rear electrode, and a power source, the bus bar entirely surrounding the peripheral edge of the lit field, and
a clearcoat top layer covering the front electrode.

15. The vehicle according to claim 14, wherein:
the rear electrode is a film coating layer formed from a sprayed conductive material that is sprayed on the interior surface of the roof.

16. The vehicle according to claim 14, further including the power source for providing power to activate the phosphor layer to emit light.

17. The vehicle according to claim 10, wherein the phosphor layer emits light when a door of the vehicle is moved from a closed position to an open position.

18. The vehicle according to claim 10, the phosphor layer selectively emits light by operation of a switch.

19. The vehicle according to claim 10, wherein the electroluminescent light source is coextensive with an entire area of the headliner, and is not included within a housing for mounting the electroluminescent light source to the interior surface of the roof.

20. The vehicle according to claim 10, wherein the fabric layer defines an exposed surface of the headliner that is visible from a passenger compartment of the vehicle.

\* \* \* \* \*